(12) United States Patent
Zhou

(10) Patent No.: US 8,689,022 B2
(45) Date of Patent: Apr. 1, 2014

(54) METHODS OF AND APPARATUS FOR CONTROLLING POWER DRAWN BY AN APPLIANCE THROUGH A USB PORT

(75) Inventor: Pei-Qi Zhou, Shanghai (CN)

(73) Assignee: Qualcomm Incorporated, San Diego, CA (US)

(*) Notice: Subject to any disclaimer, the term of this patent is extended or adjusted under 35 U.S.C. 154(b) by 380 days.

(21) Appl. No.: 13/220,796

(22) Filed: Aug. 30, 2011

(65) Prior Publication Data

US 2013/0054983 A1 Feb. 28, 2013

(51) Int. Cl.
*G06F 1/26* (2006.01)

(52) U.S. Cl.
USPC .......................................................... 713/300

(58) Field of Classification Search
USPC .......................................................... 713/300
See application file for complete search history.

(56) References Cited

U.S. PATENT DOCUMENTS

| | | | |
|---|---|---|---|
| 7,501,792 B2 | 3/2009 | Borjeson et al. | |
| 7,502,949 B2 | 3/2009 | Park | |
| 7,644,217 B2 * | 1/2010 | Butler et al. | 710/302 |
| 7,890,783 B2 | 2/2011 | Tupman et al. | |
| 8,069,356 B2 * | 11/2011 | Rathi et al. | 713/300 |
| 8,269,874 B2 * | 9/2012 | Ichieda | 348/333.01 |
| 2008/0272741 A1 | 11/2008 | Kanamori | |
| 2008/0303486 A1 | 12/2008 | Kao et al. | |
| 2011/0043162 A1 | 2/2011 | Lee et al. | |

OTHER PUBLICATIONS

Kanarnori, T, "USB Battery charger designs meet new industry standards", Feb. 21, 2008.
USB Charging Port Power Switch and Controller, Oct. 2010.
Battery Charging Specification, Rev. 1.1, Apr. 15, 2009.

* cited by examiner

*Primary Examiner* — Kim Huynh
*Assistant Examiner* — Eric Chang
(74) *Attorney, Agent, or Firm* — Kilpatrick Townsend and Stockton LLP

(57) ABSTRACT

Methods of and apparatus for controlling power drawn by an appliance through a USB port. The method includes limiting any electrical current drawn by an appliance to one of seven levels according to whether the data lines receive a bias from a power line, the data lines are in electrical communication with each other, and the power source includes a host computing device, or according to logic and voltage levels of the data lines when any of the pull-down resistor and the current and voltage sources are connected or not connected to the D+ data line. The apparatus includes a controller programmed to selectively connect a pull-down resistor, a current source, and a voltage source to a D+ data line and to limit any electrical current drawn from a power source to one of the seven levels according to voltage levels on the D+ data line and a D− data line.

15 Claims, 6 Drawing Sheets

METHODS OF AND APPARATUS FOR CONTROLLING POWER DRAWN BY AN APPLIANCE THROUGH A USB PORT

BACKGROUND

Many portable electronic appliances such as cell phones, music players, notebook computers, cameras, and other such devices have USB ports for connection to host computers with which the appliances exchange data such as address lists, digital photographs, music, videos, text, and so on. A USB port has a +5 volt power line, a D+ data line, a D− data line, and a ground line. The host computer provides DC electrical power to the power line, and the host computer communicates with the appliance through the data lines.

In addition to communicating through the data lines, the appliance can draw electrical power from the host computer through the power and ground lines. This power may be used to operate the appliance, to charge its battery, or for other purposes. The amount of power that can be drawn from the host computer is limited in some cases to about one-half watt (100 milliamps at 5 volts) and in other cases to about 2.5 watts (500 milliamps at 5 volts). At these relatively low power levels, charging the battery in the appliance can take several hours.

To avoid the need for connecting to a host computer just to charge the battery, and to provide faster charging times, dedicated charging power supplies have been developed. These power supplies are typically smaller than host computers, in some cases less than one cubic inch. They connect to the appliance through the USB port and can provide significantly more charging current than host computers, in some cases up to 10 watts (2 amps at 5 volts).

BRIEF DESCRIPTION OF THE DRAWINGS

The drawings illustrate by example implementations of the invention.

DETAILED DESCRIPTION

Figure 1A:
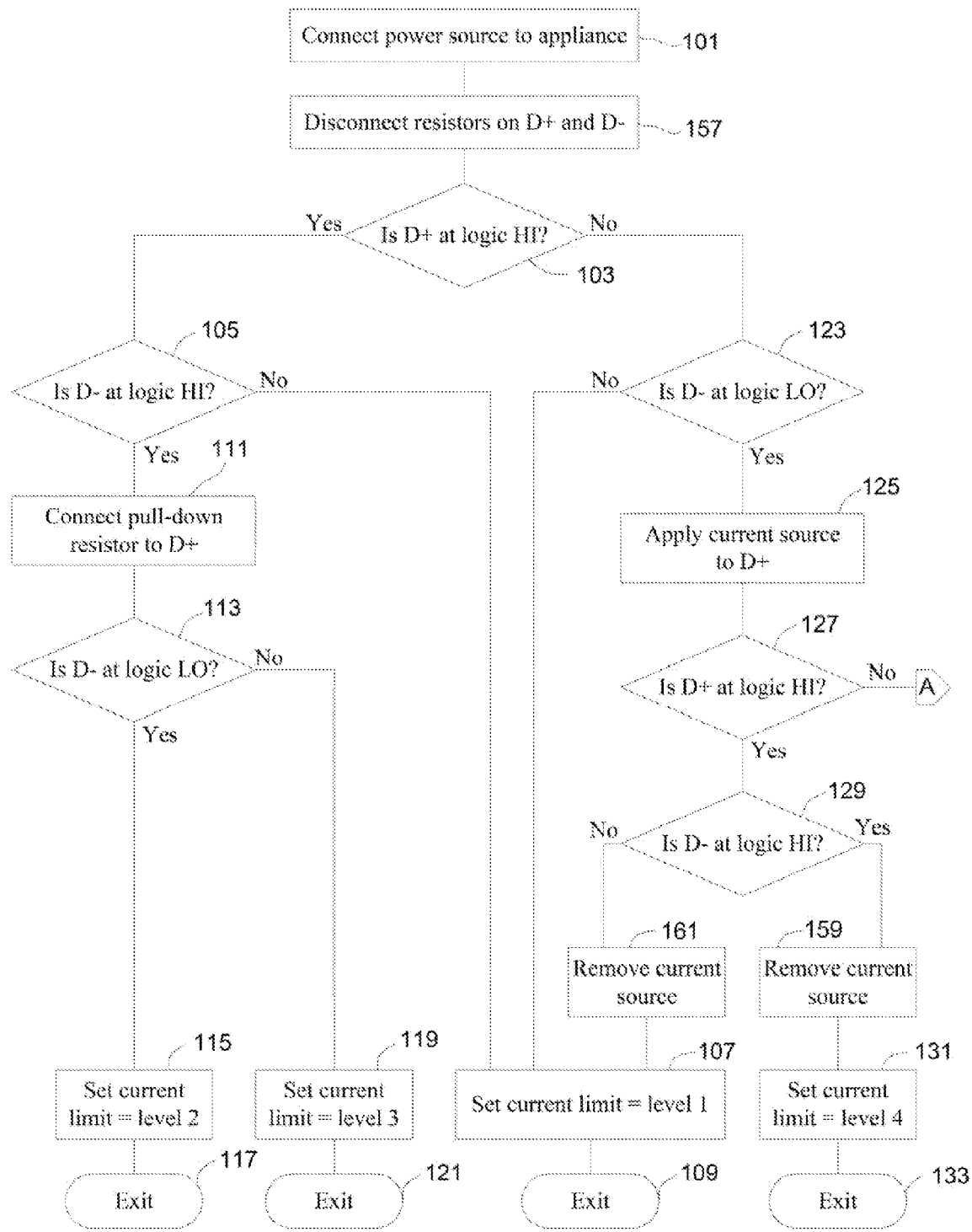
FIGS. 1A and 1B are a flowchart illustrating methods of controlling power drawn by an appliance through a USB port according to principles of the invention.

In the drawings and in this description, examples and details are used to illustrate principles of the invention. Other configurations may suggest themselves. Parameters such as voltages, current levels, and component values are approximate. Some known methods and structures have not been described in detail in order to avoid obscuring the invention. Accordingly, the invention may be practiced without limitation to the details and arrangements as described. The invention is to be limited only by the claims, not by the drawings or this description.

Methods defined by the claims may comprise steps in addition to those listed, and except as indicated in the claims themselves the steps may be performed in another order than that given.

Computers meeting the USB 2.0 specification can provide one-half watt of electrical power (100 milliamps at 5 volts DC) to appliances through their USB ports. If only one appliance is connected to the computer, as much as 2.5 watts may be available. Some relatively new computers that meet the BC 1.1 CDP specification can provide up to 7.5 watts. Different models of dedicated power supplies can provide different amounts of electrical power through their USB ports. For example, an Apple Computer Co. iPad power supply can provide 10 watts through its USB port. When an appliance is connected through a USB port to a device such as a host computer or a power supply, the appliance cannot safely draw more than the USB specification one-half watt unless it knows that the device can provide more power. There is a need for appliances to be able to determine how much power they can draw from a power source through a USB port so that they can draw as much power as is available, for example to charge their batteries as rapidly as possible, without overloading and perhaps damaging the power source.

Figure 1B:
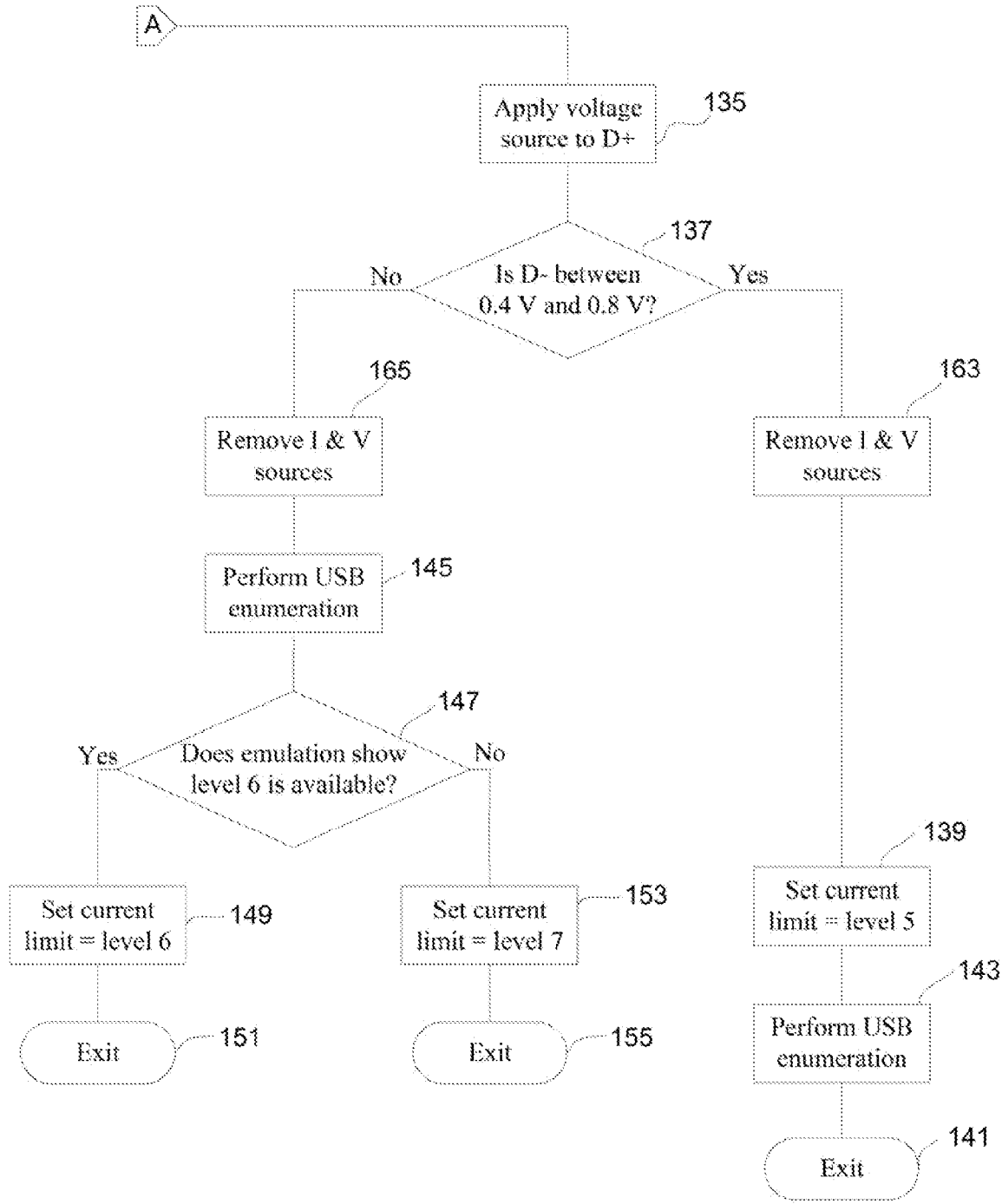

A method of controlling power drawn by an appliance through a USB port according to principles of the invention is shown in FIGS. 1A and 1B. The method begins with connecting (101) a power source to an appliance through a USB port having D+ and D− data lines, a power line, and a ground line. The power source may be for example a host computer, a dedicated charging power supply, or some other source of power.

Next is testing (103) the D+ data line to determine whether it receives a bias from the power line, and if so, testing (105) the D− data line to determine Whether it receives a bias from the power line, and if the D− data line does not receive a bias from the power line, limiting (107) any electrical current drawn from the power source to a first level, and exiting (109). "Exiting" indicates that a conclusion has been reached and no further tests will be performed.

After determining that the D+ data line receives a bias from the power line, if the test of the D− data line determines that it receives a bias from the power line, next is testing the data lines to determine whether they are in electrical communication with each other in the power source, for example by connecting (111) a pull-down resistor to the D+ data line and checking (113) the logic level of the D− data line. If the data lines are in communication with each other in the power source, the pull-down resistor will pull down the D− line as well as the D+ line. This will be indicated by a LO logic level on the D− line and this in turn indicates that the power source is of a kind that can provide a second level of current. Absence of a LO logic level on the D− data line indicates that the power supply is of a kind that can provide a third level of current. Accordingly, if the data lines are in communication with each other, as indicated by a logic LO level of the D− line, next is limiting (115) any electrical current drawn from the power Source to a second level and exiting (117), and if the data lines are not in communication with each other, next is limiting (119) any electrical current drawn from the power source to a third level and exiting (121.

If testing (103) the D+ data line determines that it does not receive a bias from the power line, next is testing (123) the D− data line to determine whether it receives a bias from the power line, and if so, limiting (107) any electrical current drawn from the power source to the first level and exiting (109), and if not, testing the D+ data line to determine whether the power source comprises a host computing device, for example by connecting (125) a current source to the D+ data line and checking (127) whether the D+ data line is at a logic HI level.

If the power source does not comprise a host computing device, next is testing (129) the D− data line to determine whether the power source can provide an electrical current at a fourth level, and if so, limiting (131) any electrical current drawn from the power source to the fourth level and exiting (133), else limiting (107) any electrical current drawn from the power source to the first level and exiting (109).

If the power source comprises a host computing device, next is testing the D− data line to determine whether the host computing device can provide an electrical current at a fifth level. This will be the case, for example, if the host computing device meets USB specification BC 1.1 CDP. The test is performed, for example, by connecting (135) a voltage source to the D+ data line and checking (137) whether the D− data line is with a predetermined voltage range, and if so, next is limiting (139) any electrical current drawn from the host computing device to the fifth level and exiting (141). Then a USB emulation may be performed (143) for purposes of data communication between the host computing device and the appliance.

If the host computing device does not meet the BC 1.1 CUP specification, next is performing (145) a USB emulation for purposes of data communication between the host computing device and the appliance. This communication will include determining (147) whether the host computing device can provide current at a sixth level. If so, next is limiting (149) any electrical current drawn from the host computing device to the sixth level and exiting (151), else limiting (153) any electrical current drawn from the host computing device to a seventh level and exiting (155).

The first current level may be regarded as a "default" current level. That is, unless the various tests indicate that a given power source can provide a higher level of current, the method defaults to limiting any current drawn from the power source to the first level. This level may be the same as the seventh level, and this level may be 100 milliamps (one-half watt) in the case of devices that meet the USB 2.0 specification. Some host computers that meet this specification can provide 500 milliamps (2.5 watts) if no other USB devices are drawing power from the host, and in that case the sixth level of current will be 500 milliamps.

Figure 3:
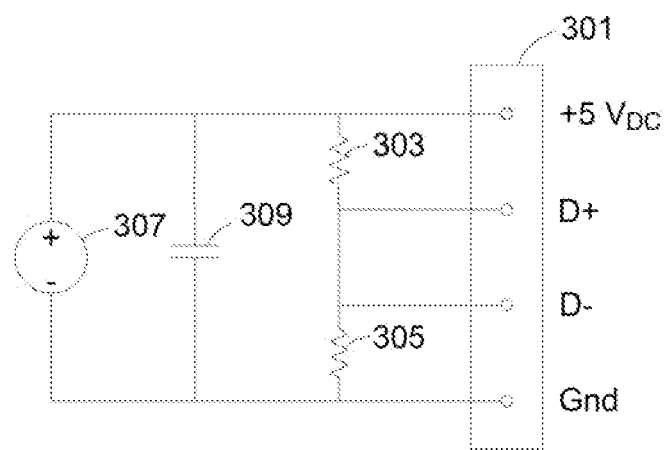
FIG. 3 is a partial schematic of a Topaz-type charging power supply from which power may be drawn according to principles of the invention.

The second level of current may be 2 amps (10 watts), corresponding with the level of current that can be provided by a "Topaz" model power supply manufactured by Hewlett-Packard Company (see FIG. 3, to be discussed presently). The third level of current may be 900 milliamps, corresponding with the level of current that can be provided by a predecessor power supply to the Topaz, also manufactured by Hewlett-Packard Company (see FIG. 4). The fourth level of current may also be 900 milliamps, corresponding with the level of current that can be provided by a power supply meeting the Open Mobile Terminal Platform (OMTP) Universal Charging Solution (UCS) standard for appliance power supplies (see FIG. 5). Of course, the level of current that is drawn from a power source may be less than the maximum specified, for conservative operation. For example, a power supply may actually be rated at 1 amp (5 watts), but in some implementations the appliance may limit its current draw to 900 milliamps, slightly less than the maximum allowable, whereas in other implementations the appliance may draw 1 amp from a power source that is rated to provide 1 amp.

If the power supply comprises a host computing device with a USB specification BC 1.1 CDP port, the fifth level of current may be set at a limit of 1.4 amps for conservative operation, just below the specification limit of 1.5 amps, or it may be set at a limit of 1.5 amps.

Still referring to FIGS. 1A and 1B, another implementation of a method of controlling power drawn by an appliance through a USB port includes connecting (101) the appliance to a power source through a USB port having D+ and D− data lines and disconnecting (157) any pull-up and pull-down resistors from the data lines in the appliance. If the D+ data line is not at logic HI (103) and the D− data line is not at logic LO (123), or if the D+ data line is at logic HI (103) and the D− data line is not at logic HI (105), then in either event next is limiting (107) any electrical current drawn from the power source to a first level and exiting (109). If both data lines are at logic HI, next is connecting (111) a pull-down resistor to the D+ data line, and if the D− data line is at logic LO (113), limiting (115) any electrical current drawn from the power source to a second level and exiting (117), else limiting (119) any electrical current drawn from the power source to a third level and exiting (121). Then the pull-down resistor may be disconnected or not, as desired.

The value of the pull-down resistor is not critical. A resistor of 15,000 ohms may be used.

If the D+ data line is not at logic HI (103) and D− data line is at logic LO (123), next is connecting (125) a current source to the D+ data line. If the D+ data line is at logic HI (127) and the D− data line is at logic HI (129), next is disconnecting (159) the current source, limiting (131) any electrical current drawn from the power supply to a fourth level, and exiting (133). If the D+ data line is at logic HI (127) and the D− data line is not at logic HI (129), next is disconnecting (161) the current source, limiting (107) any electrical current drawn from the power supply to the first level, and exiting (109).

The D+ data line not being at logic HI (127) with the current source connected indicates that the power source comprises a host computing device. At this point a voltage source is connected (135) to the D+ data line, and the D− data line is tested (137) to determine whether a voltage level of the D− data line is within a predetermined voltage range.

If the voltage level is within the predetermined range, next is disconnecting (163) the current and voltage sources, limiting (139) any electrical current drawn from the power source to a fifth level, and exiting (141). A USB enumeration may be performed (143) for purposes of data communication between the appliance and the host computing device.

If the voltage level is not within the predetermined range, next is disconnecting (165) the current and voltage sources and performing (145) a USB enumeration is performed to determine (147) whether the power source is capable of providing a sixth level of electrical current, and if so, limiting (149) any electrical current drawn from the power source to the sixth level and exiting (151), else limiting (153) any electrical current drawn from the power source to a seventh level and exiting (155).

The magnitudes of the current and voltage provided by the current and voltage sources may be selected according to the USB 2.0 and BC 1.1 CDP specifications. The current source may be selected to provide a maximum current of about 7 microamps to about 13 microamps. The voltage source may be selected to provide a maximum voltage of about 0.5 volts to about 0.7 volts. The current source can pull up the D+ data line from an OMTP power supply—resulting in a "yes" response at the output of block 221—but it cannot pull up the D+ data line from a host computing device with a 15 kilohm pull-down resistor on the D+ data line. A failure of the current source to pull up the D+ data line indicates that a host computing device is present. In this case, connecting the voltage source in addition to the current source makes it possible to distinguish between a host computing device that meets the BC 1.1 CDP specification and one that does not, because a BC 1.1 CDP host will respond to the voltage source on the D+ data line with a voltage between about 0.4 volts and 0.8 volts on the D− data line, whereas a USB 2.0 host will not do so.

Figure 2:
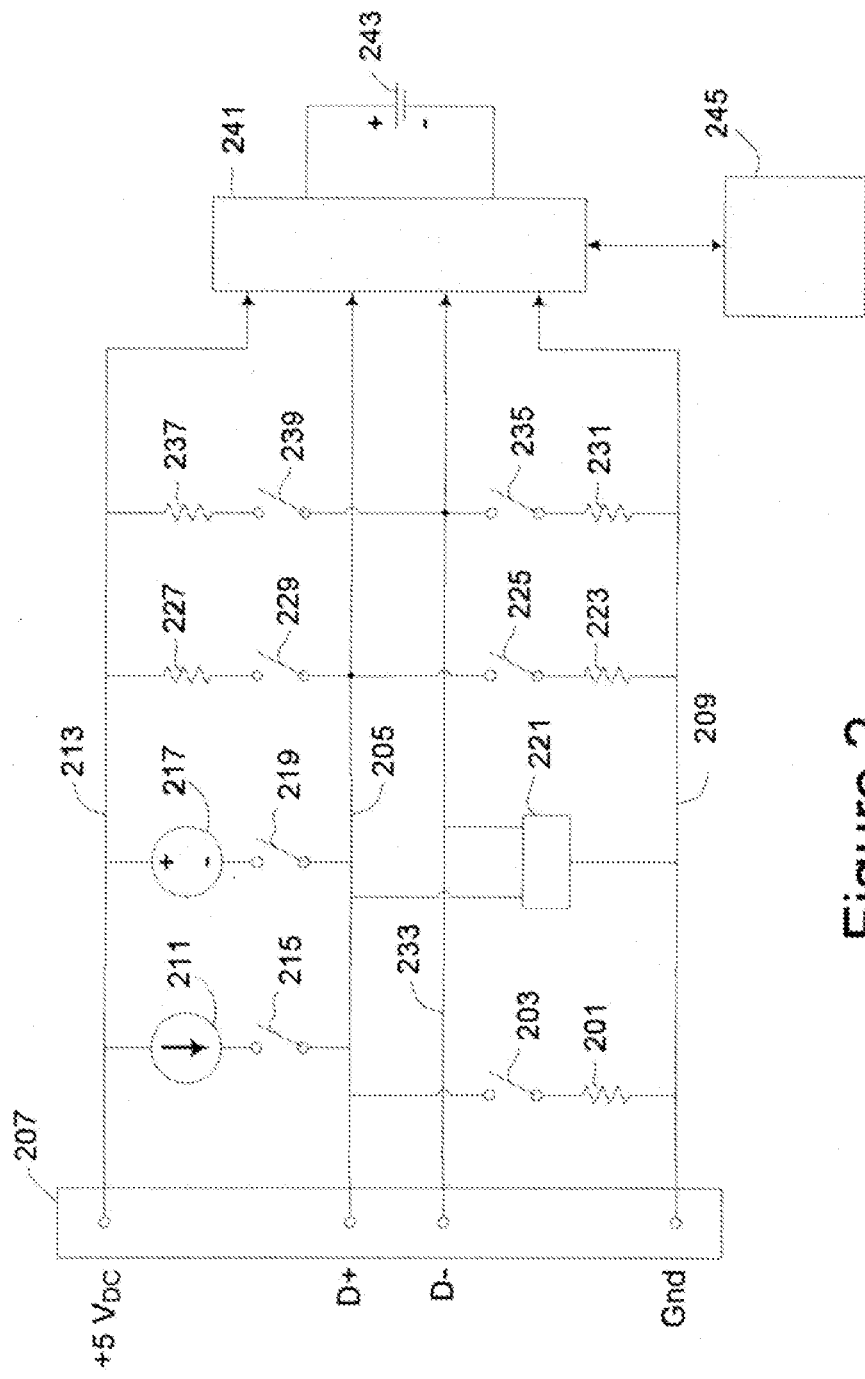
FIG. 2 is a partial schematic of apparatus for controlling power drawn by an appliance through a USB port according to principles of the invention.

FIG. 2 shows an implementation of apparatus for controlling power drawn by an appliance through a USB port according to principles of the invention. A pull-down resistor 201 is switchingly connectable from a D+ data line 203 of a USB port 205 through a switch 207 to a ground 209. A current source 211 is switchingly connectable to the D+ data line from a power line 213 through a switch 215. A voltage source 217 is switchingly connectable to the D+ data line from the power line through a switch 219.

Although the switches 203, 215 and 219 are shown in the form of simple mechanical switch contacts, in practice any of these switches may comprise a switching transistor or some other electronic component capable of making and breaking a low-impedance circuit. The resistor 201 may be a semiconductor or some other component that exhibits resistance as well as a convention resistor. The resistor 201 and the switch 203 may be combined into one component; for example, the resistor might be a transistor having a resistive path between source and drain and a gate to which a voltage is applied to switch the transistor on or off. The current source 211 and the switch 215 may be combined into one component or a group of components that provide a current source that may be turned on or off. Similarly, the voltage source 217 and the switch 219 may be combined into one or several components to provide a switchable voltage source.

A voltage sensor 221 is in communication with the data lines to sense voltages and logic levels.

Other circuit elements that may be present for other purposes include a pull-down resistor 223 switchingly connectable to the D+ data line through a switch 225, a pull-up resistor 227 switchingly connectable to the D+ data line through a switch 229, a pull-down resistor 231 switchingly connectable to a D− data line 233 through a switch 235, and a pull-up resistor 237 switchingly connectable to the D− data line through a switch 239. Any of these switches and resistors may comprise other components that switchingly establish a resistive conducting path between one of the data lines and the power or ground lines. The data lines may also connect to other circuitry (not shown) for purposes such as transmitting and receiving data.

A controller 241 is connected to the USB lines. The controller communicates with the various switches, the current and voltage sources, and the voltage sensor through appropriate circuitry (not shown). Power drawn from a power source connected to the USB port may be used by the controller to charge a battery 243. The controller limits the electrical charging current to any of a first level through a seventh level by testing the data lines in the manner described above to determine the current-supplying capability of the power source.

The controller may be programmed in various ways to perform the tests of the data lines. For example, such programming may be hard-wired into the controller. Or the programming may be stored in a data storage unit 245 in the form of machine-readable instructions.

The controller itself may comprise more than one component. For example, it may include a microprocessor and a current-limiting circuit connected between the battery and the power and ground lines. The data storage unit may comprise read-only memory, a magnetic storage medium, or any other suitable device for storing machine-readable instructions.

FIG. 3 shows a "Topaz" power supply that can provide 10 watts (2 amps) of electrical power. A USB port 301 includes power, ground, and D+ and D− data lines. The data lines are connected together. A pull-up resistor 303 which may be about 250 kilohms is connected between the data lines and the power line. A pull-down resistor 305 which may be about 300 kilohms is connected between the data lines and ground. A voltage source 307 is connected between the power and ground lines. A capacitor 309 may be connected across the voltage source. When this power supply is tested according to the principles of the invention, measuring the voltage at the D+ and D− data lines will show a HI level, and connecting a relatively low-resistance pull-down resistor (for example, 15 kilohms) between the D+ line and ground will have the effect of pulling both data lines LO. As a result, the appliance will limit its current draw to 2 amps.

Figure 4:
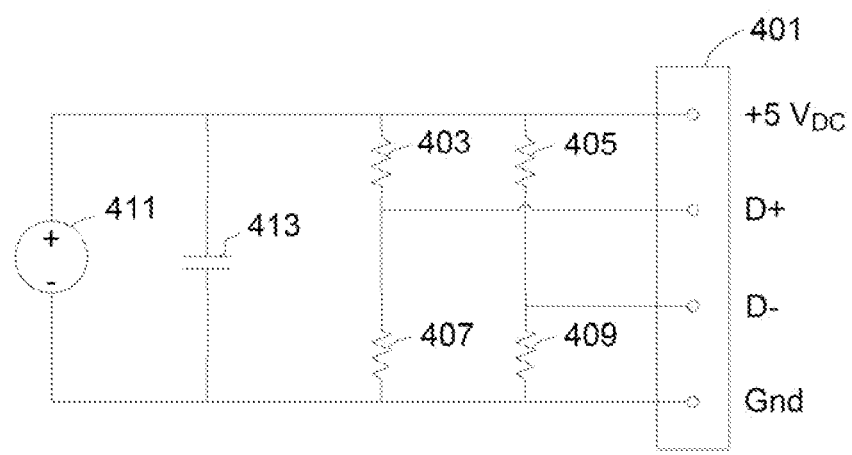
FIG. 4 is a partial schematic of a Hewlett-Packard charging power supply from which power may be drawn according to principles of the invention.

FIG. 4 shows a Hewlett-Packard power supply that can provide 4.5 watts (900 milliamps). A USB port 401 includes power, ground, and D+ and D− data lines. A pull-up resistor 403 is connected between the D+ data line and the power line, and similarly a pull-up resistor 405 is connected between the D− data line and the power line. Each of these pull-up resistors may be about 4,700 ohms. A pull-down resistor 407 is connected between the D+ data line and ground, and a pull-down resistor 409 is connected between the D− data line and ground. Each of these pull-down resistors may be about 7,500 ohms. A voltage source 411 is connected between the power and ground lines. A capacitor 413 may be connected across the voltage source. Any connection to the D+ data line will have no effect on the level of the D− data line and vice versa. Also, connecting a 15 kilohm pull-up or pull-down resistor to one of the data lines will not change the level of that data line because of the relatively lower values of the pull-up and pull-down resistors in the power supply. As a result, the appliance will limit its current draw to 900 milliamps.

Figure 5:
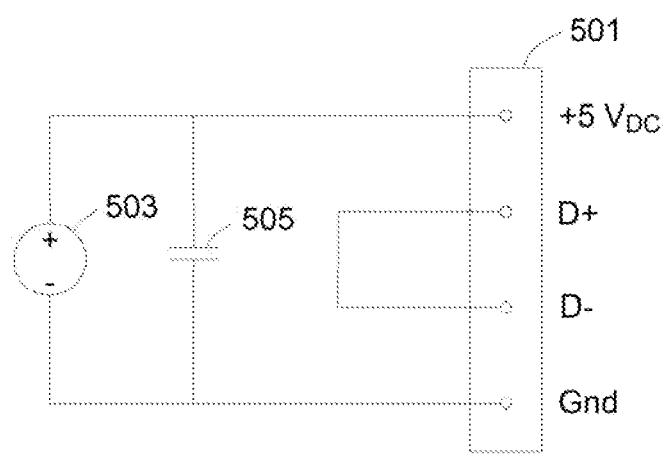
FIG. 5 is a partial schematic of an OMTP-type charging power supply from which power may be drawn according to principles of the invention.

FIG. 5 shows an OMTP power supply of the kind that can provide 4.5 watts (900 milliamps). A USB port 501 includes power, ground, and D+ and D− data lines. The D+ and D− lines are connected to each other. A voltage source 503 is connected between the power and ground lines, and a capacitor 505 may be connected across the voltage source. Testing the level of either data line will show high impedance, and connecting a pull-down resistor to either data line will result in both data lines going to a LO level. As a result, the appliance will limit its current draw to 900 milliamps.

An appliance embodying principles of the invention automatically distinguishes between four different kinds of USB-port chargers (power sources) and adjusts its current draw, for example for recharging its internal battery, according to the capacity of the charger. If it is charging its battery, the charging time is minimized by drawing as much current as the charger can provide, but without drawing too much current and possibly damaging the charger. The appliance can also distinguish among host computing devices, adjusting its current draw according to the capability of the host, which may be as much as 1.5 amps or as little as 100 milliamps.

I claim:

1. Apparatus for controlling power drawn by an appliance from a power source through a USB port having D+ and D− data lines, a power line, and a ground line, the apparatus comprising:

a pull-down resistor switchingly connectable to the D+ data line;

a current source switchingly connectable to the D+ data line;

a voltage source switchingly connectable to the D+ data line;

a voltage sensor in communication with the data lines; and
a controller programmed to selectively connect the pull-down resistor, the current source, and the voltage source to the D+ data line and to limit any electrical current drawn from the power source to any of a first level through a seventh level according to voltage levels on the D+ and D− data lines.

2. The apparatus of claim 1 and further comprising a battery in charge-receiving electrical communication with the power and ground lines through the controller.

3. The apparatus of claim 1 wherein the controller is programmed to disconnect any resistors from the D+ and D− data lines, sense voltages on the data lines, and depending on the sensed voltages:
   limit any electrical current drawn from the power source to the first level if the D+ data line carries a logic HI voltage and the D− data line does not carry a logic HI voltage;
   limit any electrical current drawn from the power source to the first level if the D+ data line does not carry a logic HI voltage and the D− data line does not carry a logic LO voltage;
   connect the pull-down resistor to the D+ data line if both data lines carry a logic HI voltage, and if the D− data line thereupon carries a logic LO voltage, limit any electrical current drawn from the power source to the second level, and if the D− data line thereupon does not carry a logic LO voltage, limit any electrical current drawn from the power source to the third level;
   connect the current source to the D+ data line if the D+ data line does not carry a logic HI voltage and the D− data line carries a logic LO voltage;
   if the D+ data line thereupon carries a logic HI voltage and the D− data line also carries a logic HI voltage, disconnect the current source and limit any electrical current drawn from the power source to the fourth level, and if the D+ data line thereupon carries a logic HI voltage and the D− data line does not, disconnect the current source and limit any electrical current drawn from the power source to the first level; and
   if the D+ data line does not carry a logic HI voltage with the current source connected, connect the voltage source to the D+ data line and sense voltage on the D− data line, and if the voltage on the D− data line is within a predetermined voltage range, disconnect the current and voltage sources and limit any electrical current drawn from the power supply to the fifth level, and if the voltage on the D− data line is not within the predetermined voltage range, disconnect the current and voltage sources and perform a USB enumeration, and if the USB enumeration shows that the power source is capable of providing the sixth level of electrical current, limit any electrical current drawn from the power source to the sixth level, and if the power source is not capable of providing the sixth level of electrical current, limit any electrical current drawn from the power source to the seventh level.

4. The apparatus of claim 3 wherein the predetermined voltage range is about 0.4 volts to about 0.8 volts.

5. The apparatus of claim 3 wherein the current source has a driving capability between about 7 microamps and 13 microamps and the voltage source has a driving capability between about 0.5 volts and 0.7 volts.

6. The apparatus of claim 3 wherein the first level is about 100 milliamps, the second level is about 2 amps, the third level is about 0.9 amps, the fourth level is about 0.9 amps, and the fifth level is about 1.4 amps.

7. A method of controlling power drawn by an appliance through a USB port, the method comprising:
   connecting a power source to an appliance through a USB port having D+ and D− data lines, a power line, and a ground line;
   testing the D+ data line to determine whether it receives a bias from the power line;
   if the D+ data line receives a bias from the power line, testing the D− data line to determine whether it receives a bias from the power line, and if the D− data line does not receive a bias from the power line, limiting any electrical current drawn from the power source to a first level and exiting, and if the D− data line receives a bias from the power line, testing the data lines to determine whether they are in electrical communication with each other in the power source, and if the data lines are in communication with each other, limiting any electrical current drawn from the power source to a second level and exiting, and if the data lines are not in communication with each other, limiting any electrical current drawn from the power source to a third level and exiting;
   if the D+ data line does not receive a bias from the power line, testing the D− data line to determine whether it receives a bias from the power line;
   if the D− data line receives a bias from the power line, limiting any electrical current drawn from the power source to the first level and exiting;
   if the D− data line does not receive a bias from the power line, testing the D+ data line to determine whether the power source comprises a host computing device;
   if the power source does not comprise a host computing device, testing the D− data line to determine whether the power source can provide an electrical current at a fourth level, and if so, limiting any electrical current drawn from the power source to the fourth level and exiting, else limiting any electrical current drawn from the power source to the first level and exiting;
   if the power source comprises a host computing device, testing the D− data line to determine whether the host computing device can provide an electrical current at a fifth level, and if so, limiting any electrical current drawn from the host computing device to the fifth level and exiting, else performing a USB emulation to determine whether the host computing device can provide current at a sixth level, and if so, limiting any electrical current drawn from the host computing device to the sixth level and exiting, else limiting any electrical current drawn from the host computing device to a seventh level and exiting.

8. The method of claim 7 wherein the second level current is about 2 amps, the third level is about 0.9 amps, the fourth level is about 0.9 amps, and the fifth level is about 1.4 amps.

9. The method of claim 7 wherein testing the D+ data line to determine whether the power source comprises a host computing device comprises:
   connecting a current source to the D+ data line;
   determining whether the D+ data line is at logic HI with the current source connected; and
   if the D+ data line is not at logic HI, determining that the power source comprises a host computing device.

10. The method of claim 9 wherein testing the D− data line to determine whether the host computing device can provide an electrical current at a fifth level comprises:
   connecting a voltage source to the D+ data line;
   determining whether a voltage level of the D− data line is within a predetermined voltage range with the voltage source connected to the D+ data line; and if the voltage level of the D− data line is within the predetermined voltage range, determining that the host computing device can provide the current at the fifth level.

11. The method of claim 10 wherein the current source has a driving capability between about 7 microamps and 13 microamps, the voltage source provides a voltage of about 0.5 volts to 0.7 volts, and the predetermined voltage range is about 0.4 volts to about 0.8 volts.

12. A method of controlling power drawn by an appliance through a USB port, the method comprising:

connecting a power source to an appliance through a USB port having D+ and D− data lines;

disconnecting any pull-up and pull-down resistors from the data lines in the appliance;

if the D+ data line is not at logic HI and the D− data line is not at logic LO, limiting any electrical current drawn from the power source to a first level and exiting;

if the D+ data line is at logic HI and the D− data line is not at logic HI, limiting any electrical current drawn from the power source to the first level and exiting;

if both data lines are at logic HI, connecting a pull-down resistor to the D+ data line, and if the D− data line is at logic LO, limiting any electrical current drawn from the power source to a second level and exiting, else limiting any electrical current drawn from the power source to a third level and exiting;

if the D+ data line is not at logic HI and the D− data line is at logic LO, connecting a current source to the D+ data line;

if both data lines are at logic HI with the current source connected, disconnecting the current source, limiting any electrical current drawn from the power source to a fourth level, and exiting;

if the D+ data line is at logic HI and the D− data line is not at logic HI with the current source connected, disconnecting the current source, limiting any electrical current drawn from the power source to the first level, and exiting;

if the D+ data line is not at logic HI with the current source connected, applying a voltage source to the D+ data line and determining whether a voltage level of the D− data line is within a predetermined voltage range;

if the voltage level of the D− data line is within the predetermined voltage range, disconnecting the current and voltage sources, limiting any electrical current drawn from the power source to a fifth level and exiting;

if the voltage level of the D− data line is not within the predetermined voltage range, disconnecting the current and voltage sources and performing a USB enumeration to determine whether the power source is capable of providing a sixth level of electrical current, and if so, limiting any electrical current drawn from the power source to the sixth level and exiting, else limiting any electrical current drawn from the power source to a seventh level and exiting.

13. The method of claim 12 wherein the current source has a driving capability between about 7 microamps and 13 microamps, the voltage source provides a voltage between about 0.5 volts and 0.7 volts, and the predetermined voltage range is about 0.4 volts to about 0.8 volts.

14. The method of claim 12 wherein the first level of current is about 100 milliamps, the second level of current is about 2 amps, the third level of current is about 0.9 amps, the fourth level of current is about 0.9 amps, and the fifth level of current is about 1.4 amps.

15. The method of claim 12 wherein the first level of current is about 100 milliamps, the second level of current is about 2 amps, the third level of current is about 1 amp, the fourth level of current is about 1 amp, and the fifth level of current is about 1.5 amps.

\* \* \* \* \*